(12) United States Patent
Mahendran et al.

(10) Patent No.: US 10,336,047 B2
(45) Date of Patent: Jul. 2, 2019

(54) METHOD OF PREVENTING CORROSION OF MATING SURFACES OF COMPONENTS

(71) Applicant: MAHINDRA AND MAHINDRA LIMITED, Mumbai (IN)

(72) Inventors: Babu Mahendran, Chennai (IN); Rahul Zumbarlal Lalwani, Chengalpattu (IN)

(73) Assignee: MAHINDRA AND MAHINDRA LIMITED, Mumbai (IN)

( * ) Notice: Subject to any disclaimer, the term of this patent is extended or adjusted under 35 U.S.C. 154(b) by 8 days.

(21) Appl. No.: 15/715,768

(22) Filed: Sep. 26, 2017

(65) Prior Publication Data

US 2018/0015708 A1 Jan. 18, 2018

Related U.S. Application Data

(63) Continuation of application No. PCT/IB2016/051563, filed on Mar. 21, 2016.

(30) Foreign Application Priority Data

Mar. 26, 2015 (IN) .......................... 1022/MUM/2015

(51) Int. Cl.
  *B32B 37/00* (2006.01)
  *B62D 27/02* (2006.01)
  (Continued)

(52) U.S. Cl.
  CPC .............. *B32B 37/003* (2013.01); *B05D 7/16* (2013.01); *B32B 37/10* (2013.01); *B32B 37/12* (2013.01);
  (Continued)

(58) Field of Classification Search
  CPC .................................................... B32B 37/003
  See application file for complete search history.

(56) References Cited

FOREIGN PATENT DOCUMENTS

IT         1035307 B   * 10/1979
JP       55116775 A    *  9/1980
            (Continued)

OTHER PUBLICATIONS

International Search Report and Written Opinion of PCT/IB2016/051563 dated Oct. 6, 2016, 9 pages.
(Continued)

*Primary Examiner* — Daniel H Lee
(74) *Attorney, Agent, or Firm* — Lathrop Gage LLP

(57) ABSTRACT

The present disclosure relates to a method of preventing corrosion of mating surfaces of components. The method comprising impregnating a polyester based carrier with an anaerobic acrylic adhesive to form an impregnated carrier and spraying a pressure sensitive acrylic adhesive on one surface of the impregnated carrier to form an impregnated carrier having a pressure sensitive acrylic adhesive layer, which is protected using a protective silicon release liner to configure a pasting surface. The pasting surface is pasted on a first component, such that pasting layer is in contact with first component. A second component is abutted to first component with the impregnated carrier there between and force is applied on first and second components such that the anaerobic acrylic adhesive oozes out from the impregnated carrier and coats both mating surfaces in absence of oxygen to commence and complete curing of anaerobic acrylic adhesive on the mating surfaces of the first and the second components.

7 Claims, 2 Drawing Sheets

(51) Int. Cl.
  *B05D 7/16*    (2006.01)
  *B32B 37/10*   (2006.01)
  *B32B 37/12*   (2006.01)
  *B32B 37/26*   (2006.01)
  *C09J 5/02*    (2006.01)
  *C09J 133/08*  (2006.01)

(52) U.S. Cl.
  CPC ............ *B32B 37/187* (2013.01); *B32B 37/26* (2013.01); *B62D 27/02* (2013.01); *C09J 5/02* (2013.01); *C09J 133/08* (2013.01); *B32B 2037/268* (2013.01); *B32B 2260/021* (2013.01); *B32B 2260/046* (2013.01); *B32B 2307/714* (2013.01); *C09J 2433/00* (2013.01)

(56) References Cited

FOREIGN PATENT DOCUMENTS

| | | |
|---|---|---|
| JP | S55 116775 A | 9/1980 |
| JP | S55 116776 | 9/1980 |
| JP | S55 116779 | 9/1980 |
| JP | H1060381 A | 3/1998 |
| WO | WO 1980/00029 A1 | 1/1980 |
| WO | WO 2010/118123 A2 | 10/2010 |

OTHER PUBLICATIONS

Hardenable anaerobic pressure sensitive adhesives—comprising an acrylic resin, a thermoplastic polymer and a curing system, Oct. 20, 1979, 35 pages.

\* cited by examiner

METHOD OF PREVENTING CORROSION OF MATING SURFACES OF COMPONENTS

RELATED APPLICATIONS

This application is a continuation of PCT/IB2016051563 filed on Mar. 21, 2016, which claims priority to Indian Patent Application No. 1022/MUM/2015 filed on Mar. 26, 2015. The contents of each of the aforementioned patent applications are hereby incorporated by reference in their entirety.

FIELD

The present disclosure relates to a method for preventing corrosion of mating surfaces of components.

DEFINITIONS

As used in the present disclosure, the following words and phrases are generally intended to have the meaning as set forth below, except to the extent that the context in which they are used to indicate otherwise.

Anaerobic acrylic adhesive: Anaerobic acrylic adhesive derive their name from the characteristic of requiring a relatively oxygen free environment for proper cure, such as found in closely mating assemblies/parts/components.

BACKGROUND

Components, such as hinges, are integral parts of automobiles. Hinges are typically made of steel/iron and are bolted to the body frame of an automobile and the inner sides of doors, in a body shop. After the bolting step, the whole assembly with closures, also referred to as Body in White (BIW), is taken through paint processes such as phosphating, electro-deposition, top-coat and the like, which helps to prevent corrosion of the automobile parts.

During the paint process, it is observed that the protective coating does not reach the mating surfaces between the hinge and the automobile part. These mating surfaces, when exposed to environmental factors such as moisture, get corroded over a period of time.

Various methods are known for preventing corrosion of the mating surfaces of components. One such method involves the application of a zinc foil on the mating surfaces. Although the process is simple, it is expensive. Another such method involves the use of epoxy sealers or spot weldable sealers between the mating surfaces. These sealers act as barriers between the mating surfaces and the environment, thereby preventing galvanic type corrosion. The use of sealers is more cost effective than the use of zinc foils, however, these spot sealers have to be applied manually, which makes the process laborious and time consuming and often results in an inconsistent end product. Also, the application of spot sealers leads to marks on the components, such as automobile body frame and automobile parts, which is not desirable.

There is, therefore, a need to envisage a method and/or a device for preventing corrosion of the mating surfaces of components, which mitigates the drawbacks associated with the conventional methods of corrosion prevention.

OBJECTS

Some of the objects of the present disclosure, which at least one embodiment herein satisfies, are as follows:

It is an object of the present disclosure to ameliorate one or more problems of the state of the art or to at least provide a useful alternative.

An object of the present disclosure is to provide a method and device for preventing corrosion of various mating surfaces of components and/or parts.

Another object of the present disclosure is to provide a method of preventing corrosion of the various mating surfaces of parts and/or components of varied shapes and dimensions, in a simple and economical manner.

Other objects and advantages of the present disclosure will be more apparent from the following description, which is not intended to limit the scope of the present disclosure.

SUMMARY

The present disclosure describes a method of preventing corrosion of the mating surfaces of components. The method comprises impregnating a polyester based carrier with at least one anaerobic acrylic adhesive to form an impregnated carrier, and spraying at least one pressure sensitive acrylic adhesive on one surface of the impregnated carrier to form an impregnated carrier having a pressure sensitive acrylic adhesive layer. The pressure sensitive acrylic adhesive layer is protected using a protective silicon release liner to configure a pasting surface on the impregnated carrier. The surface is pasted on a first component after removing the protective silicon release liner from the pressure sensitive adhesive layer. The pasting surface is in contact with the first component. A second component is abutted to the first component such that the impregnated carrier is sandwiched therebetween, and force is applied on the abutted first and second components such that the anaerobic acrylic adhesive oozes out from the impregnated carrier and coats mating surfaces of the first and second components in the absence of oxygen to commence and complete curing of the anaerobic acrylic adhesive layer on mating surfaces of the first and the second components.

The present disclosure further provides a laminate for preventing corrosion of the mating surfaces of components. The laminate comprises a polyester based carrier material impregnated with at least one anaerobic acrylic adhesive to form an impregnated carrier, and at least one pasting layer, comprising at least one pressure sensitive acrylic adhesive sprayed on the impregnated carrier protected by a silicon release liner.

BRIEF DESCRIPTION OF THE ACCOMPANYING DRAWING

Figure 5:
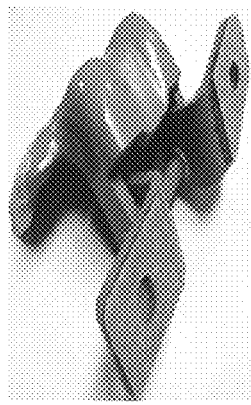
Figure 6:
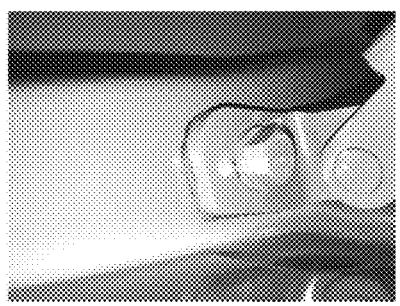

FIG. 5 illustrates an automobile door hinge bolted to an automobile body frame, wherein a polyester carrier impregnated with an anaerobic acrylic adhesive is applied on a first automobile part, in accordance with an embodiment of the present disclosure; and FIG. 6 illustrates an automobile door hinge bolted to an automobile body frame, wherein a polyester carrier impregnated with an anaerobic acrylic adhesive is applied on the mating surfaces, in accordance with an embodiment of the present disclosure.

DETAILED DESCRIPTION

Galvanic corrosion is an electrochemical process wherein, when two different metals come into physical or electrical contact with each other, in a common electrolyte, the less reactive metal (cathode) decreases its corrosion potential at the expense of the more reactive metal (anode). For example, when the unprotected surfaces of a metallic part, such as a hinge, or the body frame of an automobile is exposed to the environment, the bare metallic surfaces become prone to corrosion, especially in the presence of moisture.

Corrosion degrades the useful properties of materials and structures, including strength, appearance and permeability to liquids and gases. Repairing the damage caused by corrosion is also expensive. Therefore, a method for effective prevention of corrosion is needed.

Figure 1:
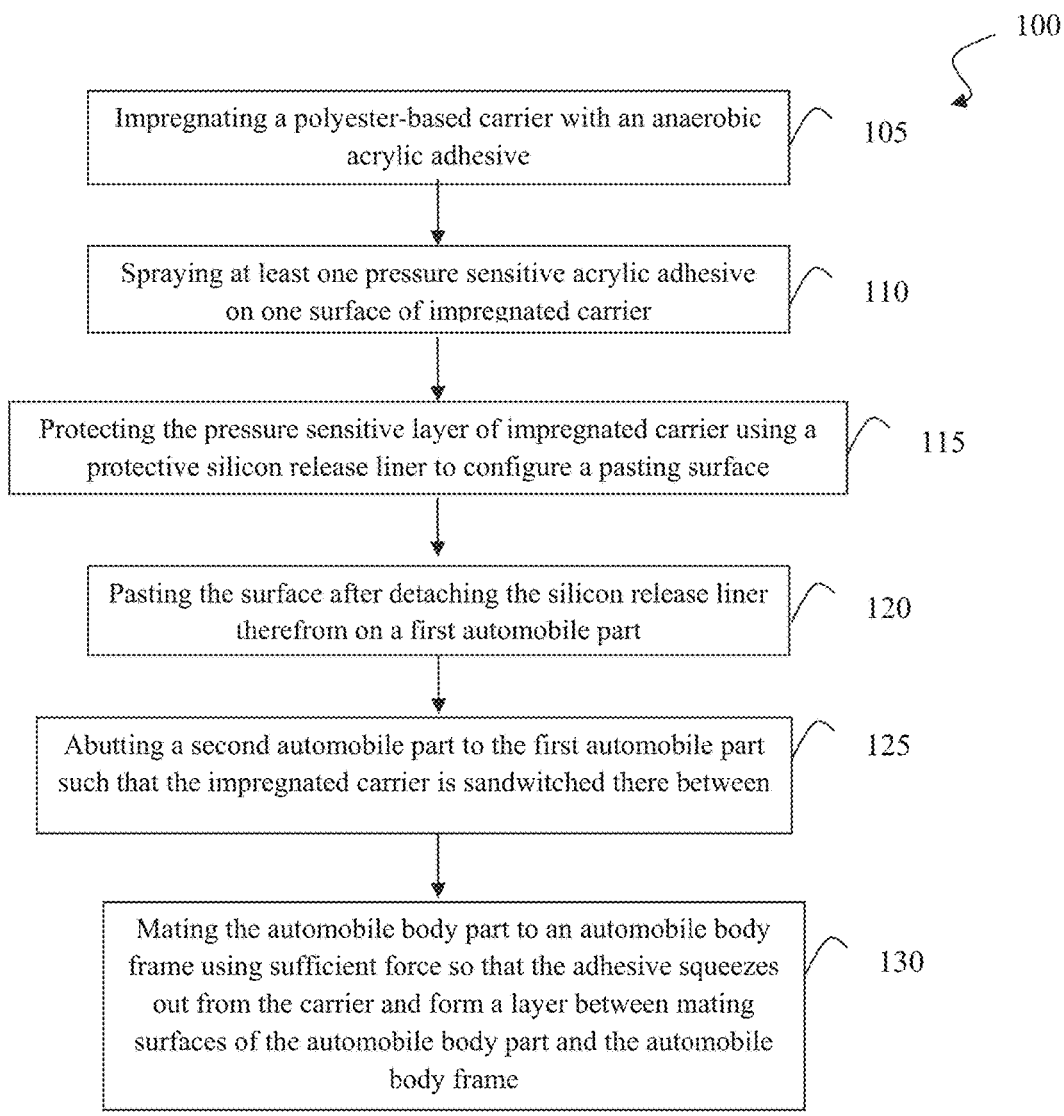
FIG. 1 illustrates a flowchart showing the method steps of preventing corrosion of mating surfaces of automobiles, in accordance with an embodiment of the present disclosure.

FIG. 1 of the present disclosure provides a flowchart for a method (100) for preventing corrosion of the mating surfaces of components. In an embodiment of the present disclosure, the component is an automobile part, such as hinges, automobile body frame, door frame, and hood.

The method (100), in accordance with the present disclosure comprises the steps presented herein below.

In the first step (105), a polyester based carrier is impregnated with an anaerobic acrylic adhesive to form an impregnated carrier.

In the second step (110), the impregnated carrier is sprayed, on one surface with a pressure sensitive acrylic adhesive, to form an impregnated carrier having a pressure sensitive acrylic adhesive layer.

The carrier can be shaped as per the required configuration. In one embodiment, the polyester based carrier is selected from the group including, but not limited to, polyethylene terephthalate (PET), nylon, polyphenylene ether, polyphenylene ester and polyphthalamide base.

In the third step (115), the pressure sensitive acrylic adhesive layer is protected using a protective silicon release liner to configure a pasting surface on the impregnated carrier.

In the fourth step (120), the surface after detaching the silicon release liner therefrom is pasted on a first component. The pasting surface is in contact with the first component.

In the fifth step (125), a second component is abutted to the first component such that the impregnated carrier is sandwiched therebetween.

In the next step (130), force is applied on the abutted surfaces of the first and the second components. The force is applied such that the anaerobic acrylic adhesive oozes out from the impregnated carrier and coats both the mating surfaces in the absence of oxygen, and the curing of the anaerobic acrylic adhesive on the mating surfaces of the first and the second components commence and is completed.

In an embodiment of the present disclosure, the force applied is in the range of 40 to 45 $N/mm^2$. The force applied should be sufficient to squeeze out the anaerobic acrylic adhesive from the impregnated carrier and to form a layer between the mating surfaces of the components. In an embodiment, during this step, the anaerobic acrylic adhesive gets cured in the absence of oxygen and forms a non-penetrable layer between and around the periphery of the mating surfaces of the automobile part and the automobile body frame. Such a layer prevents corrosion of the mating surfaces of both the automobile part and the automobile body frame.

The method (100) of preventing corrosion inhibits any contact of moisture and humidity with any of the exposed metal surfaces of the components where they are mated, thus preventing corrosion.

Figure 2:
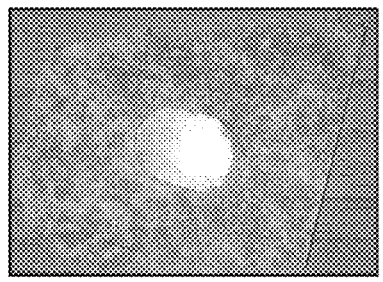
FIG. 2 illustrates a polyester carrier impregnated with an anaerobic acrylic adhesive, in accordance with one embodiment of the present disclosure.
Figure 3:
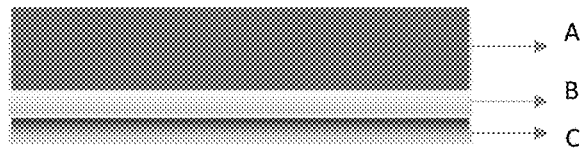
FIG. 3 illustrates different layers of a laminate, which can be applied to the mating surfaces for preventing corrosion, in accordance with one embodiment of the present disclosure.

The polyester based carrier containing the anaerobic acrylic adhesive can be prepared as a laminate (FIG. 2), which can be directly and easily applied to the mating surfaces, for preventing corrosion. The laminate in accordance with one embodiment of the present disclosure comprises three layers, as illustrated in FIG. 3. However the laminate is not limited to this particular embodiment, and more layers can be present in the laminate. Layer "A" is essentially a polyester based non-woven fabric carrier material that is impregnated with an anaerobic acrylic adhesive. In an exemplary embodiment, the carrier material is polyethylene terephthalate (PET). Layer "B" is a pressure sensitive acrylic adhesive that is sprayed on layer A, to form a pasting layer. The pressure sensitive acrylic adhesive is sprayed on one surface of the carrier material impregnated with the anaerobic acrylic adhesive. Layer "C" is a protective silicon release liner. The protective silicon release liner is applied on the pressure sensitive acrylic adhesive layer to configure a pasting surface on the impregnated carrier. The protective silicon layer can be easily peeled off/detached prior to the step of pasting the laminate on the components.

In an embodiment, the laminate can be applied between the automobile part and the body frame during the manufacturing process. The laminate is applied by peeling off/detaching the silicon release liner, and pasting the laminate with the pressure sensitive adhesive side onto the first automobile part, such as a hinge. This action fixes the laminate to the first automobile part (FIG. 5). The first automobile part with the laminate is then mated or bolted onto a second automobile part, such as the body frame, at an appropriate force with impregnated carrier therebetween (FIG. 6). During this step, the anaerobic acrylic adhesive that is impregnated in the PET carrier oozes out and forms a layer on both the sides of the carrier, i.e., on the mating surfaces of the first and second automobile parts. This area gets depleted of oxygen, which activates the curing of the anaerobic acrylic adhesive, thereby providing a protective layer that does not allow moisture or humidity to come into contact with the mating surfaces.

In accordance with one embodiment, the laminate of the present disclosure can be pasted during the assembly of automobile body, in a body shop. After pasting the laminates, the whole assembly with closures, also referred to as Body in White (BIW), can be passed through the 'Paint Shop' for painting. The Paint Shop includes processes such as Pre-Treatment, Phosphating, Cathodic Electro-Deposition (Dip Coating), Baking and the like.

Pre-treatment (PT) and cathodic electro deposition (CED) compatibility of the adhesives was carried out to ensure its compatibility with the carrier, and the components.

For testing the compatibility of the laminates of the present disclosure with the chemicals used in the Paint Shop, the laminates were kept in the pre-treatment chemicals in a suitable container in the temperature range of 45 to 55° C. under continuous stirring for a time period ranging from 6 to 10 hours. The laminates were removed from the pre-treatment chemicals and then kept in Cathodic Electro-Deposition (CED) paint material for 22 to 26 hours under stirring. Such CED paint material was used to coat the panels and was then examined for any defects.

If the CED paint material gets contaminated with the laminate, defects such as craters and marks are observed, otherwise the coated surface remains smooth and uniform. If the coated surface is smooth and uniform, then it is considered that the material under test is compatible. In this way, the compatibility of the laminates with the paint materials and other chemicals used during the Paint Shop processes is carried out.

Figure 4:
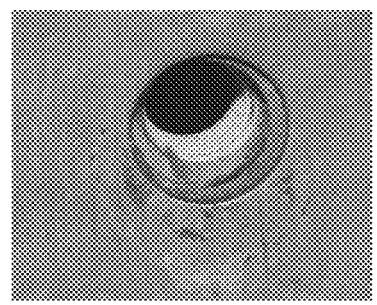
FIG. 4 illustrates the surface of an automobile part that has been protected from corrosion by using the method of the present disclosure, in accordance with an embodiment of the present disclosure.

The test samples prepared by the method of the present disclosure were tested in the corrosion chamber as per the standard corrosion test protocol SAE J 2334 Laboratory Cyclic Corrosion Test without $SO_2$ impingement. The sample which was protected using the method of the present disclosure did not show any corrosion on the mating surfaces of the hinges and the body frame, even after exposure to corrosive conditions for 60 days as illustrated in FIG. 4 (the smudges are adhesive marks). This test shows that the laminate of the present disclosure is compatible with the paint materials and other chemicals used during the Paint Shop processes.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation Technical Advancements and Economical Significance The method of preventing corrosion of the mating surfaces of components has several technical advantages including but not limited to the realization of:
Preventing corrosion of the mating surfaces of components, such as hinges and body frame;
Providing a cost effective solution to the problem of corrosion in the mating surfaces of components; and
Provides quality consistency and eliminate the scope for manual error without investment in complex application mechanism.

The invention claimed is:

1. A method of preventing corrosion of the mating surfaces of components, said method comprising:
(i) impregnating a polyester based carrier with at least one anaerobic acrylic adhesive to form an impregnated carrier;
(ii) spraying at least one pressure sensitive acrylic adhesive on one surface of said impregnated carrier to form an impregnated carrier having a pressure sensitive acrylic adhesive layer;
(iii) protecting said pressure sensitive acrylic adhesive layer using a protective silicon release liner to configure a pasting surface on said impregnated carrier;
(iv) pasting said pasting surface after detaching said silicon release liner therefrom on a first component, wherein said pasting surface is in contact with said first component;
(v) abutting a second component to said first component such that said impregnated carrier is sandwiched therebetween; and
(vi) applying force on said abutted first and second components such that said anaerobic acrylic adhesive oozes out from said impregnated carrier and coats mating surfaces of said abutted first and second components in the absence of oxygen to commence and complete curing of said anaerobic acrylic adhesive on mating surfaces of said first and said second components.

2. The method as claimed in claim 1, wherein the step of abutting comprises bolting said first and said second components.

3. The method as claimed in claim 1, wherein said component is an automobile part.

4. The method as claimed in claim 3, wherein said automobile part comprise an automobile hinge, an automobile door frame, an automobile body frame, and an automobile hood.

5. The method as claimed in claim 1, wherein the force used is in the range of 40-45 N/mm.

6. The method as claimed in claim 1, further comprises at least one of pre-treating, phosphating, dip coating, and baking the components pasted with said impregnated carrier having at least one pasting layer.

7. The method as claimed in claim 1, wherein said polyester based carrier material is at least one selected from the group comprising polyethylene terephthalate (PET), nylon, polyphenylene ether, polyphenylene ester and polyphthalamide base.

* * * * *